Feb. 24, 1925.

T. M. KOEDER

CORNET ATTACHMENT

Filed Feb. 28, 1922

1,527,589

Inventor

T. M. Koeder

By D. Swift

Attorney

Patented Feb. 24, 1925.

1,527,589

UNITED STATES PATENT OFFICE.

THEOPHIL M. KOEDER, OF NAPERVILLE, ILLINOIS.

CORNET ATTACHMENT.

Application filed February 28, 1922. Serial No. 539,862.

*To all whom it may concern:*

Be it known that I, THEOPHIL M. KOEDER, a citizen of the United States, residing at Naperville, in the county of Du Page, State of Illinois, have invented a new and useful Cornet Attachment; and I do hereby declare the following to be a full, clear, and exact description of the invention, such as will enable others skilled in the art to which it appertains to make and use the same.

The invention relates to cornets and has for its object to provide in combination therewith a double slide, each slide of which moves in an opposite direction thereby allowing the instrument to be placed in a different key according to its key, said slide being so constructed as not to modify the construction of the cornet.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
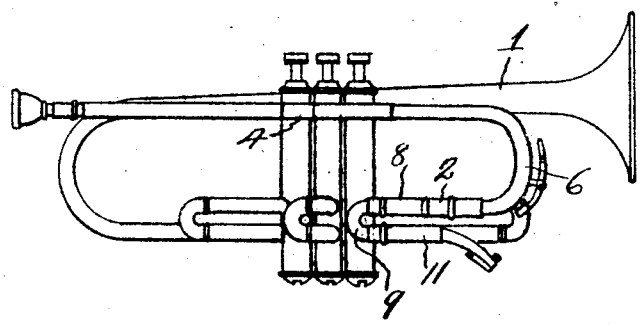
Figure 1 is a side elevation of a cornet showing the double slide applied thereto.
Figure 2:
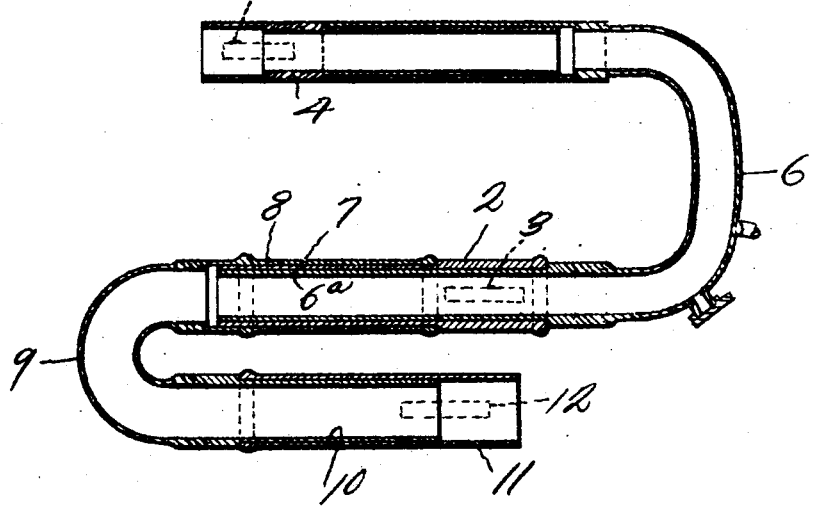
Figure 2 is an enlarged vertical longitudinal sectional view through the slide.

Referring to the drawings, the numeral 1 designates a conventional form of cornet and 2 a stationary tubular support carried by the cornet. A second stationary tubular member 4 is provided, which is supported on a post 5. Telescopically engaging the stationary sleeve 2 and the stationary sleeve 4 is a slide 6, which enters into the sleeve 2 full length enabling the musician to draw the slide 6 a maximum distance to put the instrument into the key of A, known as the quick change slide to A. Telescopically engaging over the rear end 7 of the sleeve 2 is the tubular arm 8 of a U-shaped slide 9, the arm 10 of which telescopically engages in a stationary sleeve 11 supported on the cornet by means of a post 12. It will be seen that the slides 6 and 9 move in opposite directions and that they telescopically engage the stationary sleeves in such a manner that the maximum of adjustably is obtained and that the slides are so mounted that they operate in opposite directions. With the slide 9 disposed with its arm 8 over the arm $6^a$ of the slide 6 as shown in Figure 2, said slide 9 may be used as a tuning slide on the instrument. The stationary sleeve 2 enables the musician to use the two slides 6 and 9 on the same tubing and in such a manner that they may be moved in opposite directions.

From the above it will be seen that a double slide construction is provided for cornets, which slide construction is so constructed that its slides may be moved in opposite directions thereby allowing a maximum range of tuning and transposition.

The invention having been set forth what is claimed as new and useful is:—

The combination with a cornet, of a double slide therefor, said double slide comprising three spaced stationary sleeves in parallel relation to each other and in the same plane, oppositely disposed U-shaped slides movable in opposite directions and having their arms extending towards each other, the lower arm of one slide and the upper arm of the other slide being in axial alignment with each other and telescopically disposed in relation to each other and in the centrally disposed tubular sleeve, the outer arms of the U-shaped slides telescopically engaging the upper and lower stationary sleeves, one of the arms of one of the U-shaped members telescopically engaging within the centrally disposed stationary sleeve, one of the arms of the other U-shaped member telescopically engaging over the centrally disposed stationary sleeve and a supporting post connected to the centrally disposed stationary sleeve intermediate the arms of the U-shaped slides slidably connected thereto.

In testimony whereof I have signed my name to this specification in the presence of two subscribing witnesses.

THEOPHIL M. KOEDER.

Witnesses:
C. E. RICE,
LYDA WILLARD.